(No Model.) 3 Sheets—Sheet 1.

J. B. GRANGER.
RUNNER FOR WHEELED VEHICLES.

No. 401,429. Patented Apr. 16, 1889.

Witnesses:
J. P. Theo. Lang
E. J. Fenwick

Inventor
James B. Granger
by his Attys
Mason, Fenwick and Lawrence

N. PETERS, Photo-Lithographer, Washington, D. C.

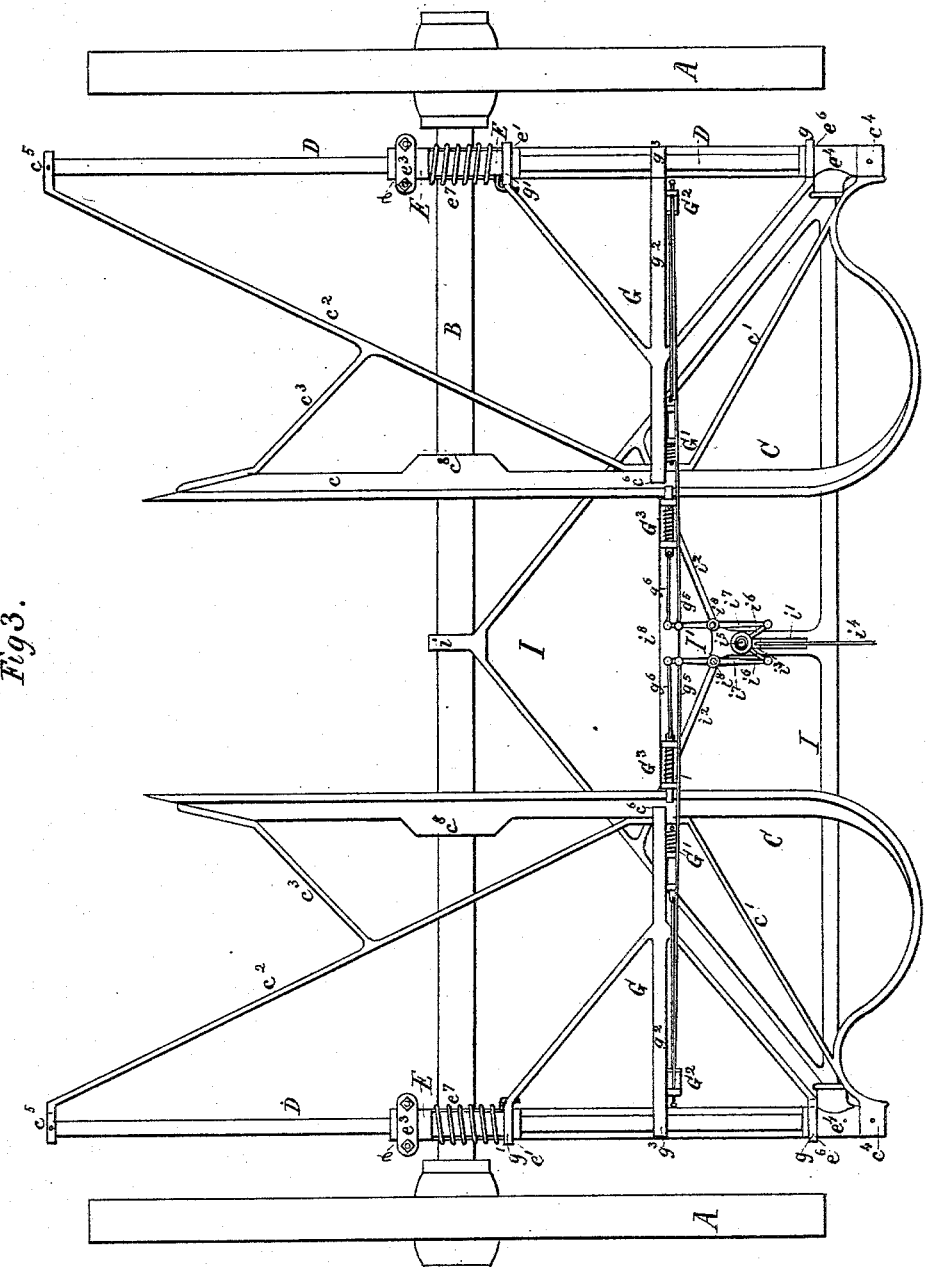

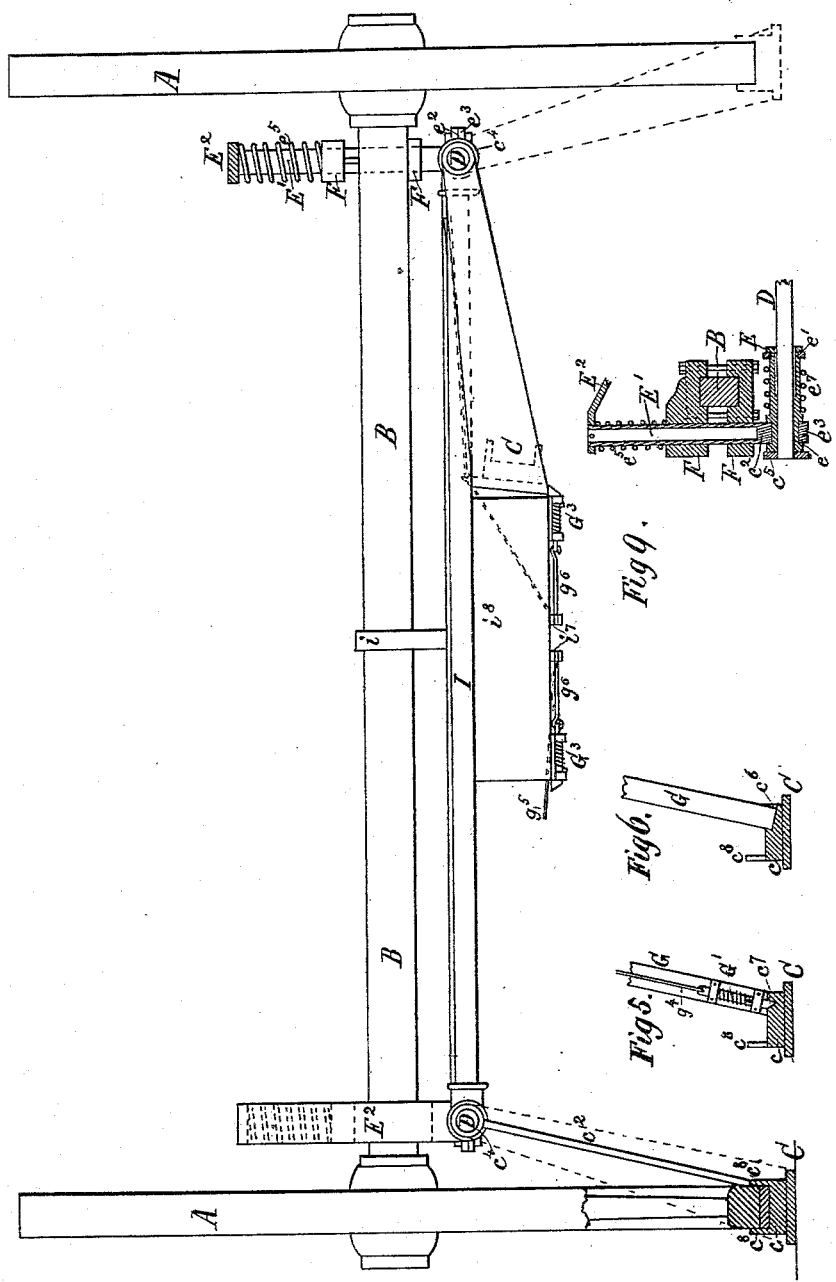

UNITED STATES PATENT OFFICE.

JAMES B. GRANGER, OF DELHI, NEW YORK.

RUNNER FOR WHEELED VEHICLES.

SPECIFICATION forming part of Letters Patent No. 401,429, dated April 16, 1889.

Application filed January 14, 1889. Serial No. 296,316. (No model.)

*To all whom it may concern:*

Be it known that I, JAMES B. GRANGER, a citizen of the United States, residing at Delhi, in the county of Delaware and State of New York, have invented certain new and useful Improvements in Wheeled Vehicles with Sleigh-Runner Attachments; and I do hereby declare the following to be a full, clear, and exact description of the invention, such as will enable others skilled in the art to which it appertains to make and use the same.

My invention relates to wheeled trucks provided with permanently-hinged adjustable sleigh-runners and their attachments, and the main features of utility and novelty lie in certain constructions, combinations, and arrangements of parts, whereby sleigh-runners can be made to form permanent hinged attachments of the truck, and their supports are adapted to be swung laterally from a horizontal or nearly horizontal position beneath the axle-tree of the truck to an oblique position, and can also be slid forward and adjusted so as to bring the rear ends of the runners to a position forward of and in line with the wheels, and thereupon the draft of the horses upon the carriage caused to run the wheels upon the runners a proper distance, thereby effecting the mounting of the wheels upon the runners and securely locking the wheels and runners together in such manner as to prevent the wheels moving or turning on their axles. The mechanism employed is simple and easy of manipulation, and the manner of hanging the truck-wheels is such that inconvenient bind and unnecessary friction between the wheels and runners during the mounting and dismounting of the carriage upon its runners are prevented, and on the return of the engine to the truck-house the wheels can be unlocked and backed off the runners and the runners swung laterally inward and upward and locked up out of the way. By my invention the great delay and inconvenience of running wheeled fire-engines or other trucks over snow and ice are avoided, and the losses from the destruction of horses as well as property from fire by reason of delay are greatly lessened, for with my invention the fire-engine can be run out of the engine-house on its wheels and then instantly adjusted upon the runners, and on return to the engine-house can be as readily dismounted from its runners, remounted upon its wheels, and run into its place.

Figure 1:
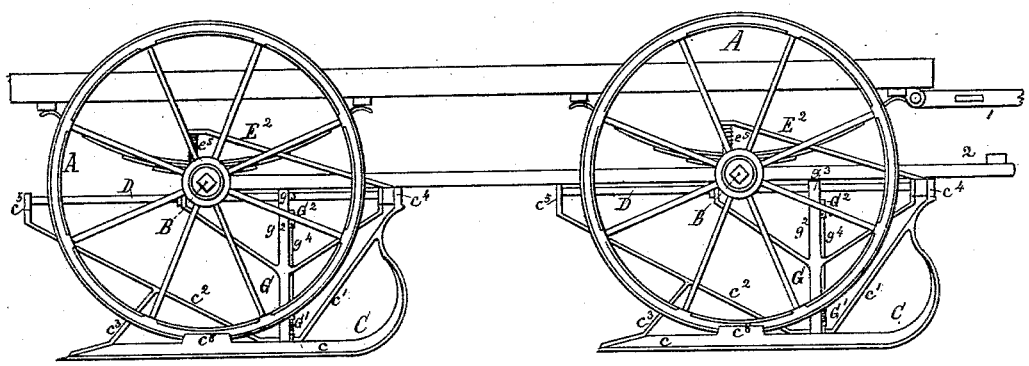
Figure 2:
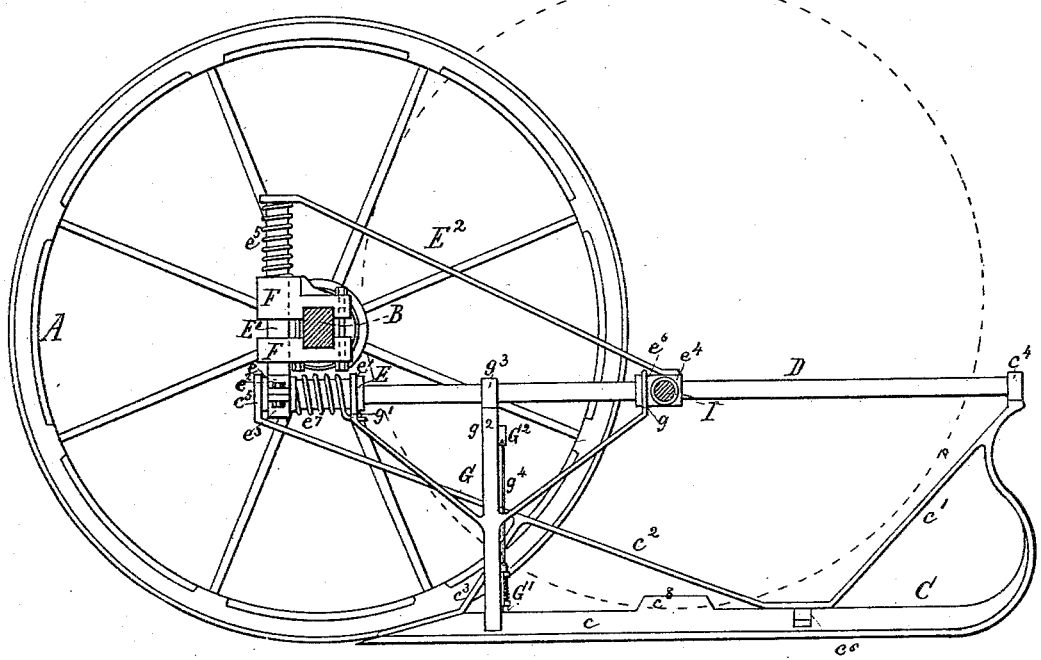
Figure 7:
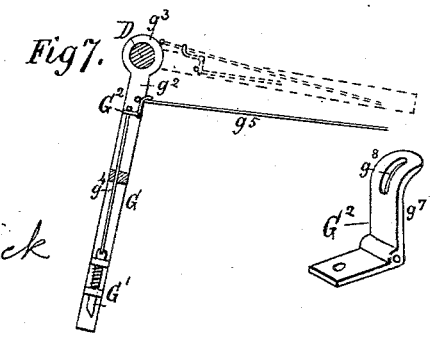
Figure 8:
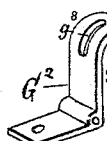

In the accompanying drawings, Figure 1 is a side elevation of a four-wheeled truck mounted upon sleigh-runners in accordance with my invention. Fig. 2 is a vertical longitudinal section of a portion of said truck; and Fig. 3 is a transverse section of the same, representing the runners folded up and the wheels free. Fig. 4 is a partial section and partial front view of the same, representing in section the lower portion of one of the wheels and runners in a locked condition and in elevation the other runner folded up and locked. Fig. 5 is a detail view of a bolt by which the runner is held in position when locked with the wheel, the runner being shown in section. Fig. 6 is a detail view of the lower portion of a locking-brace and a section of a runner locked thereby. Fig. 7 is a diagram of the operating mechanism of the locking-bolt shown in Fig. 5. Fig. 8 is a perspective view of a bell-crank lever forming part of said mechanism, and Fig. 9 is a vertical central section of a bracket holding the frame to which the runner is attached.

The letter A in the drawings represents the wheels of a steam fire-engine or other vehicle, B the axles, and C the runners. Said runners are of the usual shape and are re-enforced by top bars, $c$, as shown. They are otherwise stiffened and strengthened by means of diagonal braces $c'$ $c^2$ $c^3$, on which two heads, $c^4$ $c^5$, are applied or formed. Between these heads $c^4$ $c^5$ longitudinal rods D are fastened, which are held in bearings E on the axle, so that they can slide and turn in the same. The bearings E are tubular and provided with annular recessed portions $e$ $e'$, the former of which serve as bearings for the clasps of rods E′, said clasps consisting, respectively, of a semicircular head, $e^2$, formed at the end of a rod, E′, and a semicircular cap, $e^3$, suitably fastened to the head $e^2$, and both so fitting and clasping the annular recessed portion $e$ as to allow the bearing E to turn without sliding longitudinally. The rods E′ are held loosely but snugly in upright positions by clamps F, fastened to the axle B, and their upper ends are fastened to braces $E^2$, which extend frontward and are provided with sleeves $e^4$, fitted around the rods D. Springs $e^5$, interposed between the braces $E^2$ and clamps F and coiled around the rods E', hold the bearings E and sleeves $e^4$ at the proper level. Each sleeve $e^4$ is provided with an annular recess, $e^6$, into which an annular head, $g$, of a Y-shaped brace, G, is fitted. Another annular head, $g'$, of the said brace G is fitted into the annular recess $e'$ of the bearing E, and thus the brace G is longitudinally fixed, while it can swing in the recesses $e'$ $e^6$ or around the rod D.

In order to make each of the braces G vertically stout, they are respectively provided with an upper central arm, $g^2$, having an annular head, $g^3$, which embraces a rod, D. The foot portion of the brace G rests in a notch, $c^6$, in the top bar, $c$, of a runner, C, while the same is in use, and it is held in place by means of a spring-bolt, G', and a notch, $c^7$, in the bar $c$. The bolt G' is fastened to the lower portion of the brace G and is operated by means of a rod, $g^4$, from a bell-crank lever, $G^2$, pivoted to the upper central arm, $g^2$, of the brace. Two bell-crank levers of two corresponding opposite braces, G G, are simultaneously operated by a mechanism supported upon an auxiliary frame, I. This auxiliary frame I is of triangular shape, being fastened at its apex $i$ to the center of the axle-tree B and at its base to the sleeves $e^4$ of the braces G. At the center of the base of the frame I a slotted plate, I', is provided, which is braced by arms $i^2$ to the converging sides of the frame I, as shown in Fig. 3. In the slot $i'$ of the said plate a sliding block, $i^3$, is moved by a rod, $i^4$, which latter in practice will extend to some point convenient for manipulation. A pin, $i^5$, in the sliding block $i^3$ is provided with links $i^6$, which are pivoted to levers $i^7$, the latter being fulcrumed at $i^8$ upon the arms $i^2$. When the rod $i^4$ is pulled forward, the links $i^6$ push the levers $i^7$ outward, so that they move two pairs of rods, $g^5$ $g^6$, and thereby disengage two pairs of spring-bolts, as will be seen. The rods $g^5$ extend to and operate the bell-crank levers $G^2$, and in order to prevent bending or binding of the said rods when the runners are folded up the upper portion, $g^7$, of each bell-crank lever is curved and provided with a slot, $g^8$, whereby the respective rods $g^5$ are allowed to accommodate themselves to both positions of the bell-crank lever without any injury thereto, as illustrated by full and dotted lines in Fig. 7.

The rods $g^6$ are connected to spring-bolts $G^3$, which are so arranged on and connected to a transverse plate, $i^8$, secured between the arms $i^2$, as to lock and hold the runners C when folded up. At the point where the wheel rests upon the runner two flanges, $c^8$, are provided on the runners, which serve to hold the runner and wheel rigidly together in a lateral direction, while the Y-shaped brace G fixes the runner to the axle B in a longitudinal direction, and the spring $e^5$ holds the runner in contact with the wheel in a perpendicular direction.

In Fig. 4 the right side of the vehicle is represented with the runner folded up and held by a spring-bolt, $G^3$. When the rod $i^4$ is pulled forward, both spring-bolts $G^3$ are drawn away from the respective runners, which thereupon swing down, and in order to avoid a violent shock as they touch the ground a spring, $e^7$, is provided on each bearing E, which springs, by bearing upon the Y-shaped brace G, serve as counter-balances and cause each runner to descend with a moderate speed and touch the ground without heavy concussion. The Y-shaped braces G are next unlocked from the runners by a further pull upon the rod $i^4$ sufficiently to withdraw the bolts G' from their notches $c^7$, whereupon the braces G are swung out of their notches $c^6$, and now the runners can be moved forward and swung right in front of their respective wheels, as shown in Fig. 2, and, the runners being thus adjusted, the vehicle is then moved forward and the wheels caused to mount the runners and roll forward upon them until they arrive between the flanges $c^8$, when the braces G are swung by hand into their respective notches $c^6$ and automatically locked therein by the bevel-ended bolts G'. When the wheels are to be brought into use, the braces G are unlocked by pulling the rod $i^4$ forward, as described, and then swung out of their notches $c^6$. The vehicle is now moved backward until the wheels leave the runners, the runners are swung inward clear of the wheels and moved backward until the braces G come opposite the notches $c^6$, into which they are then moved by hand and locked automatically, and the runners are next folded up and locked by the spring-bolts $G^3$. The attachment for the draft-horses may be either on a plane with the axle or above such plane, as illustrated at 1 and 2, and the spring-bolts may be made without beveled ends.

What I claim is—

1. The combination, with a truck of a wheeled vehicle, of the horizontally-hinged and longitudinally-sliding runners hung to the axle-tree, whereby said vehicle can be mounted upon said runners, as a sleigh, and also dismounted from said runners and remounted upon wheels, as a carriage, substantially as described.

2. In combination with the axle B of a vehicle, a spring-support, E E' $E^2$ $e^4$ $e^5$, clamp F, sliding and revolving rod D, and runner C, substantially as and for the purpose described.

3. The combination of a folding and sliding runner, C, wheel-axle B, frame I, and spring-bolt $G^3$, substantially as described.

4. The combination of a sliding and folding runner, C, having a spring-support upon the axle B of a vehicle, the swinging brace G, having a spring-bolt, G', and notches $c^6$ $c^7$ in the runner, substantially as and for the purpose described.

5. The combination of the swinging brace G, spring-bolt G', rods $g^4$ $g^5$, bell-crank lever $G^2$, levers $i^7$, links $i^6$, and sliding block $i^3$, substantially as and for the purpose described.

6. In combination with the bearing E and brace G, the spring $e^7$, substantially as and for the purpose described.

In testimony whereof I hereunto affix my signature in presence of two witnesses.

JAMES B. GRANGER.

Witnesses:
W. G. EDGERTON,
GEO. A. STURGES, Jr.